(12) United States Patent
Araki

(10) Patent No.: US 9,114,807 B2
(45) Date of Patent: Aug. 25, 2015

(54) TRANSMISSION CONTROL DEVICE, HYBRID VEHICLE, TRANSMISSION CONTROL METHOD, AND COMPUTER PROGRAM

(75) Inventor: Tomohiko Araki, Tokyo (JP)

(73) Assignee: HINO MOTORS, LTD., Tokyo (JP)

( * ) Notice: Subject to any disclaimer, the term of this patent is extended or adjusted under 35 U.S.C. 154(b) by 110 days.

(21) Appl. No.: 13/819,444

(22) PCT Filed: Oct. 20, 2011

(86) PCT No.: PCT/JP2011/074180
§ 371 (c)(1),
(2), (4) Date: Feb. 27, 2013

(87) PCT Pub. No.: WO2012/053604
PCT Pub. Date: Apr. 26, 2012

(65) Prior Publication Data
US 2013/0158770 A1 Jun. 20, 2013

(30) Foreign Application Priority Data
Oct. 21, 2010 (JP) .................. 2010-236612

(51) Int. Cl.
*B60W 20/00* (2006.01)
*B60W 10/00* (2006.01)
*B60K 6/00* (2007.10)
(Continued)

(52) U.S. Cl.
CPC .................. *B60W 20/30* (2013.01); *B60K 6/48* (2013.01); *B60W 10/06* (2013.01); *B60W 10/08* (2013.01); *B60W 20/00* (2013.01); *B60W 30/1846* (2013.01); *B60W 30/19* (2013.01); *F16H 63/502* (2013.01); *B60W 2710/0661* (2013.01); *B60W 2710/0666* (2013.01); *B60W 2710/0672* (2013.01); *B60W 2710/083* (2013.01);
(Continued)

(58) Field of Classification Search
CPC ........ B60K 6/48; B60W 10/06; B60W 10/08; B60W 10/10
USPC ........................................... 701/22
See application file for complete search history.

(56) References Cited

U.S. PATENT DOCUMENTS

| 2004/0127332 | A1* | 7/2004 | Kang et al. ............. 477/45 |
| 2006/0217229 | A1* | 9/2006 | Ogata ................... 477/15 |
| 2010/0030436 | A1 | 2/2010 | Suzuki et al. |

FOREIGN PATENT DOCUMENTS

| CN | 1840395 A | 10/2006 |
| CN | 101704366 A | 5/2010 |

(Continued)

OTHER PUBLICATIONS

EPO english translation of jp2006280049.*
(Continued)

*Primary Examiner* — Fadey Jabr
*Assistant Examiner* — Yazan A Soofi
(74) *Attorney, Agent, or Firm* — Cowan, Liebowitz & Latman, P.C.; Mark Montague

(57) ABSTRACT

To improve the drivability of an automobile at the time of transmission which restricts a torque of an engine, a hybrid automobile is structured which performs transmission control for performing control so that an output restriction is temporarily released in a step of restoring a torque that is reduced once in neutral at the time of transmission during the output restriction by an output restriction control unit and a torque by a motor is added to the torque of the engine.

3 Claims, 5 Drawing Sheets

(51) Int. Cl.
- *B60K 6/48* (2007.10)
- *B60W 10/06* (2006.01)
- *B60W 10/08* (2006.01)
- *B60W 30/184* (2012.01)
- *B60W 30/19* (2012.01)
- *F16H 63/50* (2006.01)
- *F16H 61/04* (2006.01)

(52) U.S. Cl.
CPC ..... *F16H2061/0433* (2013.01); *Y02T 10/6221* (2013.01); *Y02T 10/6286* (2013.01); *Y10T 477/23* (2015.01)

(56) References Cited

FOREIGN PATENT DOCUMENTS

| | | | |
|---|---|---|---|
| EP | 1 127 731 | A2 | 8/2001 |
| EP | 1 865 175 | A2 | 12/2007 |
| EP | 2 206 908 | A1 | 7/2010 |
| JP | 2006-280049 | A | 10/2006 |
| JP | 2006280049 | A * | 10/2006 |

OTHER PUBLICATIONS

The above reference was cited in the International Search Report of the corresponding International Application, PCT/JP2011/074180 dated Dec. 13, 2011.

The above references were cited in a Supplementary European Search Report issued on Feb. 26, 2014, that issued in the corresponding European Patent Application No. 11834443.1.

The above references were cited in an Office Action of the corresponding CN 201180040643.4 application; dated Jan. 7, 2015, with an English Translation.

* cited by examiner

TRANSMISSION CONTROL DEVICE, HYBRID VEHICLE, TRANSMISSION CONTROL METHOD, AND COMPUTER PROGRAM

CROSS REFERENCE TO RELATED APPLICATIONS

This is a U.S. national stage of application No. PCT/JP2011/074180, filed on Oct. 20, 2011. Priority under 35 U.S.C. §119(a) and 35 U.S.C. §365(b) is claimed from Japanese Patent Application No. 2010-236612, filed on Oct. 21, 2010, the disclosure of which are also incorporated herein by reference.

TECHNICAL FIELD

The present invention relates to a transmission control device, a hybrid vehicle, a transmission control method, and a computer program.

BACKGROUND ART

The limitation of the torque of the engine in response to the torque required by a driver is a measure for reducing the exhaust gas of a vehicle. This gives a constant limitation on the torque of the engine even though the driver fully depresses the accelerator pedal, so that the vehicle is controlled to output torque less than the maximum torque (for example, see patent literature PTL1).

CITATION LIST

Patent Literature

PTL1: JP 2006-280049 A

SUMMARY OF INVENTION

Technical Problem

When a vehicle shifts the gears, the torque of the engine is temporarily reduced in order to transfer the gear from a gear number before the shift into neutral. After that, the gear is shifted to the gear number after the shift in order to return the torque of the engine that has temporarily been reduced. At that time, if the vehicle is in a mode in which the torque of the engine is limited in response to the request torque from the driver, the torque is limited even when the torque of the engine is returned after the gear has been shifted to the gear number after the shift from neutral. This causes the delay of the return of the torque in the gear shifting and aggravates the drivability.

In light of the foregoing, an objective of the present invention is to provide a transmission control device, a hybrid vehicle, a transmission control method, and a computer program that can improve the drivability in the gear shifting in a mode in which the torque of the engine is limited in response to the torque required by the driver.

Solution to Problem

An aspect of the present invention is directed to a transmission control device. According to the aspect of the present invention, the transmission control device of a hybrid vehicle that includes an engine and an electric motor, that is capable of running by the engine or the electric motor or capable of running by cooperation between the engine and the electric motor, includes: an output limitation means for limiting torque output from the engine and/or the electric motor; and an automatic gear shifting means for shifting a gear number according to a variation in a vehicle speed, in which the automatic gear shifting means performs a control for temporarily reducing the torque output from the engine in neutral while a gear is transferred from a gear number before the shift to a gear number after the shift through neutral once, and, when the gear shifting is performed during output limitation, the output limitation means performs a control for temporarily cancelling the output limitation in a process for returning the torque that has temporarily been reduced in neutral, and adding torque by the electric motor to torque of the engine.

Another aspect of the present invention is directed to a hybrid vehicle. The hybrid vehicle includes the transmission control device according to the present invention.

Still another aspect of the present invention is directed to a transmission control method. The transmission control method of a hybrid vehicle, that includes an engine and an electric motor, that is capable of running by the engine or the electric motor or capable of running by cooperation between the engine and the electric motor, and that includes an output limitation means for limiting torque output from the engine and/or the electric motor, and an automatic gear shifting means for shifting a gear number according to a variation in a vehicle speed, the automatic gear shifting means performing a control for temporarily reducing the torque output from the engine in neutral while a gear is transferred from a gear number before the shift to a gear number after the shift through neutral once, includes a step in which, when the gear shifting is performed during output limitation, the output limitation means performs a control for temporarily cancelling the output limitation in a process for returning the torque that has temporarily been reduced in neutral, and adding torque by the electric motor to torque of the engine.

Still another aspect of the present invention is directed to a computer program. The computer program causes an information processing apparatus to implement a function of the transmission control device according to the present invention.

Advantageous Effects of Invention

The present invention can improve the drivability in the gear shifting in a mode in which the torque of the engine is limited in response to the torque required by the driver.

DESCRIPTION OF EMBODIMENTS

Hereinafter, a hybrid vehicle according to an embodiment of the present invention will be described with reference to FIGS. 1 to 5.

Figure 1:
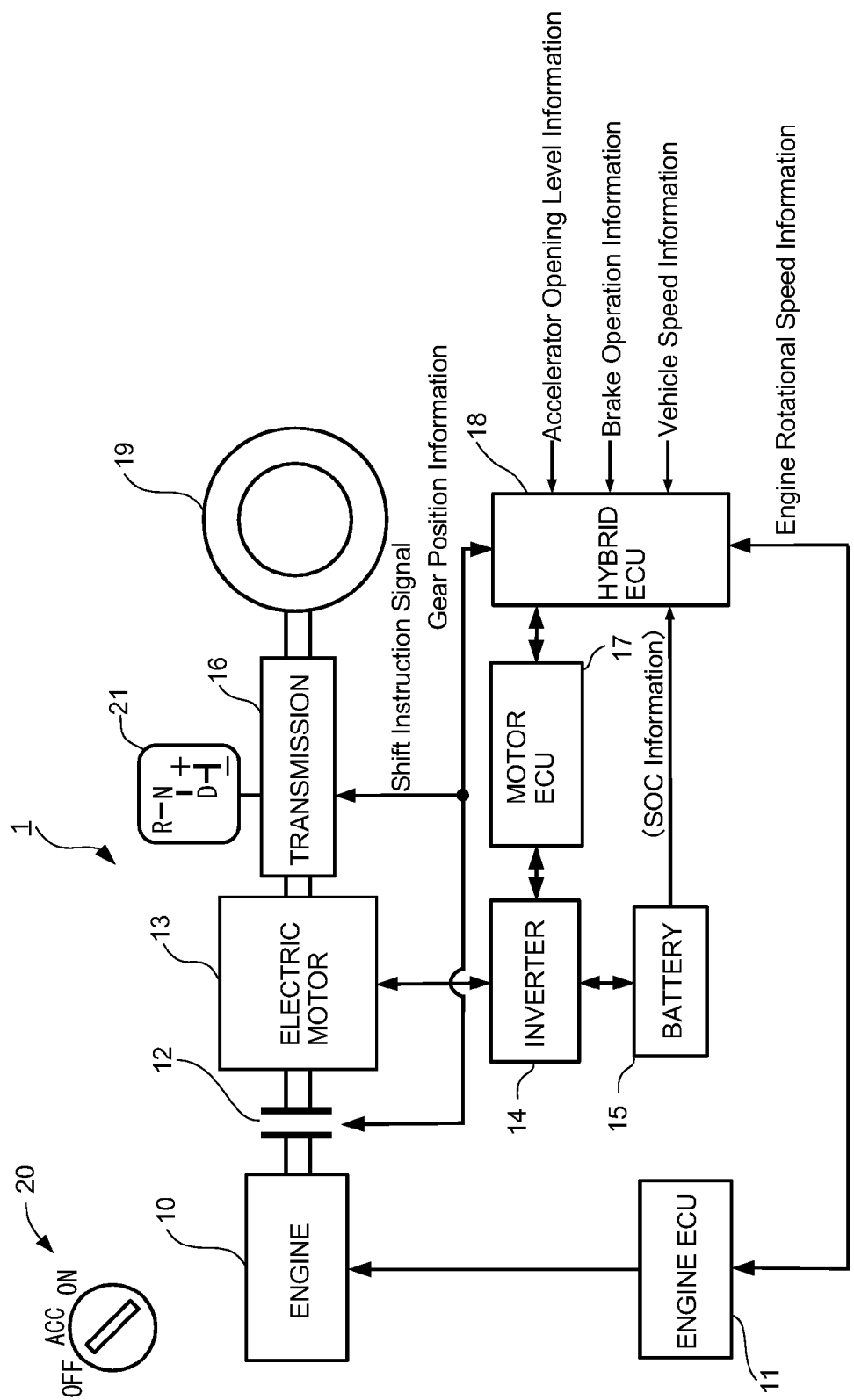
{FIG. 1} It shows a block diagram for illustrating an exemplary structure of a hybrid vehicle according to an embodiment of the present invention.

FIG. 1 is a block diagram for illustrating an exemplary structure of a hybrid vehicle 1. The hybrid vehicle 1 is an example of a vehicle. The hybrid vehicle 1 is driven by an engine (internal combustion engine) 10 and/or an electric motor 13 through a gear box having an automated mechanical/manual transmission. The hybrid vehicle 1 can performs an output limitation for limiting the torque output from the engine 10 and/or the electric motor 13. Note that the automated mechanical/manual transmission is a transmission that can automatically shift the gears while having the same structure as a manual transmission.

The hybrid vehicle 1 includes the engine 10, an engine Electronic Control Unit (ECU) 11, a clutch 12, the electric motor 13, an inverter 14, a battery 15, a transmission 16, a motor ECU 17, a hybrid ECU 18, a wheel 19, and a key switch 20. Note that the transmission 16 includes the above-mentioned automated mechanical/manual transmission and is operated by a shift unit 21 (not shown in the drawings) including a drive range (hereinafter, referred to as a D (Drive) range).

The engine 10 is an example of an internal combustion engine, and is controlled by the engine ECU 11. The engine 10 internally combusts gasoline, light oil, Compressed Natural Gas (CNG), Liquefied Petroleum Gas (LPG), alternative fuel, or the like in order to generate power for rotating a shaft and transfer the generated power to the clutch 12.

The engine ECU 11 is a computer working in coordination with the motor ECU 17 according to the instructions from the hybrid ECU 18, and controls the engine 10, for example, the amount of fuel injection and the valve timing. For example, the engine ECU 11 includes a Central Processing Unit (CPU), an Application Specific Integrated Circuit (ASIC), a microprocessor (micro-computer), a Digital Signal Processor (DSP), and the like, and internally has an operation unit, a memory, an Input/Output (I/O) port, and the like.

The clutch 12 is controlled by the hybrid ECU 18, and transfers the shaft output from the engine 10 to the wheel 19 through the electric motor 13 and the transmission 16. In other words, the clutch 12 mechanically connects the rotating shaft of the engine 10 to the rotating shaft of the electric motor 13 by the control of the hybrid ECU 18 in order to transfer the shaft output of the engine 10 to the electric motor 13. On the other hand, the clutch 12 cuts the mechanical connection between the rotating shaft of the engine 10 and the rotating shaft of the electric motor 13 so that the shaft of the engine 10 and the rotating shaft of the electric motor 13 can rotate at different rotational speeds from each other.

For example, the clutch 12 mechanically connects the rotating shaft of the engine 10 to the rotating shaft of the electric motor 13, for example, when the hybrid vehicle 1 runs by the power of the engine 10 and this causes the electric motor 13 to generate electric power, when the driving force of the electric motor 13 assists the engine 10, and when the electric motor 13 starts the engine 10.

Alternatively, for example, the clutch 12 cuts the mechanical connection between the rotating shaft of the engine 10 and the rotating shaft of the electric motor 13 when the engine 10 stops or is in an idling state and the hybrid vehicle 1 runs by the driving force of the electric motor 13, and when the hybrid vehicle 1 decelerates or runs on the down grade and the electric motor 13 generates electric power (regenerates electric power) while the engine 10 stops or is in an idling state.

Note that the clutch 12 differs from the clutch operated by the driver's operation of a clutch pedal, and is operated by the control of the hybrid ECU 18.

The electric motor 13 is a so-called motor generator that supplies a shaft output to the transmission 16 by generating the power for rotating the shaft using the electric power supplied from the inverter 14, or that supplies electric power to the inverter 14 by generating the electric power using the power for rotating the shaft supplied from the transmission 16. For example, when the hybrid vehicle 1 accelerates or runs at a constant speed, the electric motor 13 generates the power for rotating the shaft to supply the shaft output to the transmission 16 in order to cause the hybrid vehicle 1 to run in cooperation with the engine 10. Further, the electric motor 13 works as an electric generator, for example, when the electric motor 13 is driven by the engine 10, or when the hybrid vehicle 1 runs without power, for example, the hybrid vehicle 1 decelerates or runs on the down grade. In that case, electric power is generated by the power for rotating the shaft supplied from the transmission 16 and is supplied to the inverter 14 in order to charge the battery 15.

The inverter 14 is controlled by the motor ECU 17, and converts the direct voltage from the battery 15 into an alternating voltage or converts the alternating voltage from the electric motor 13 into a direct voltage. When the electric motor 13 generates power, the inverter 14 converts the direct voltage of the battery 15 into an alternating voltage and supplies the electric power to the electric motor 13. When the electric motor 13 generates electric power, the inverter 14 converts the alternating voltage from the electric motor 13 into a direct voltage. In other words, in that case, the inverter 14 works as a rectifier and a voltage regulator for supplying a direct voltage to the battery 15.

The battery 15 is a secondary cell capable of being charged and discharged. The battery 15 supplies electric power to the electric motor 13 through the inverter 14 when the electric motor 13 generates power. Alternatively, the battery 15 is charged with the electric power generated by the electric motor 13 when the electric motor 13 generates electric power.

The transmission 16 includes an automated mechanical/manual transmission (not shown in the drawings) that selects one of a plurality of gear ratios (change gear ratios) according to the shift instruction signal from the hybrid ECU 18 in order to shift the change gear ratios and transfer the gear-shifted power of the engine 10 and/or of the electric motor 13 to the wheel 19. Alternatively, the transmission 16 transfers the power from the wheel 19 to the electric motor 13, for example, when the vehicle decelerates or runs on the down grade. Note that the automated mechanical/manual transmission can also shift the gear position to a given gear number by the driver's hand operation.

The motor ECU 17 is a computer working in coordination with the engine ECU 11 according to the instructions from the hybrid ECU 18, and controls the electric motor 13 by controlling the inverter 14. For example, the motor ECU 17 includes a CPU, an ASIC, a microprocessor (micro-computer), a DSP, and the like, and internally has an operation unit, a memory, an I/O port, and the like.

The hybrid ECU 18 is an example of a computer. For hybrid driving, the hybrid ECU 18 obtains accelerator opening level information, brake operation information, vehicle speed information, the gear position information obtained from the transmission 16, and the engine rotational speed information obtained from the engine ECU 11 in order to refer to the information, control the clutch 12 and supply the shift instruction signal in order to control the transmission 16. For hybrid driving, the hybrid ECU 18 further gives the control instructions of the electric motor 13 and the inverter 14 to the motor ECU 17 based on the obtained SOC information on the battery 15 and other information, and gives the control instruction of the engine 10 to the engine ECU 11. For example, the hybrid ECU 18 includes a CPU, an ASIC, a microprocessor (micro-computer), a DSP, and the like, and internally has an operation unit, a memory, an I/O port, and the like.

Note that a computer program to be executed by the hybrid ECU 18 can be installed on the hybrid ECU 18 that is a computer in advance by being stored in a non-volatile memory inside the hybrid ECU 18 in advance.

The engine ECU 11, the motor ECU 17, and the hybrid ECU 18 are connected to each other, for example, through a bus complying with the standard of the Control Area Network (CAN) or the like.

The wheel 19 is a drive wheel for transmitting the driving force to the road surface. Note that, although only a wheel 19 is illustrated in FIG. 1, the hybrid vehicle 1 actually includes a plurality of the wheels 19.

The key switch 20 is a switch that is turned ON/OFF, for example, by insertion of a key by the user at the start of drive. Turning ON the switch activates each unit of the hybrid vehicle 1, and turning OFF the key switch 20 stops each unit of the hybrid vehicle 1.

Figure 2:
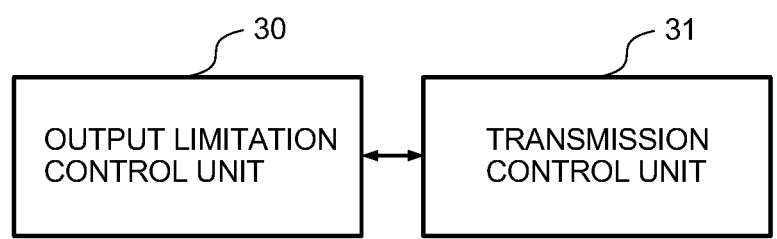
{FIG. 2} It shows a block diagram for illustrating an exemplary configuration of a function implemented in a hybrid ECU illustrated in FIG. 1.

FIG. 2 is a block diagram for illustrating an exemplary configuration of a function implemented in the hybrid ECU 18 that executes a computer program. In other words, once the hybrid ECU 18 executes a computer program, an output limitation control unit 30 and a transmission control unit 31 are implemented.

The output limitation control unit 30 performs a control for setting an acceleration that is accepted at each of the gear numbers. This limits the acceleration to a predetermined acceleration according to the gear number and the vehicle speed, for example, even when the driver depresses the accelerator to rapidly accelerate the vehicle. Concretely, a target torque is limited in order to prevent acceleration equal to or more than the predetermined acceleration. This will be described in detail below with reference to FIG. 4.

The transmission control unit 31 controls the automatic gear shifting of the hybrid vehicle 1. Note that the transmission control unit 31 controls the automatic gear shifting during output limitation in cooperation with the output limitation control unit 30.

Next, a process for the transmission control during output limitation that is performed in the hybrid ECU 18 executing a computer program will be described with reference to the flowchart illustrated in FIG. 3. Note that the flow illustrated in FIG. 3 is one cycle of the process and the process is repeatedly performed as long as the key switch 20 is in the ON state.

Figure 3:
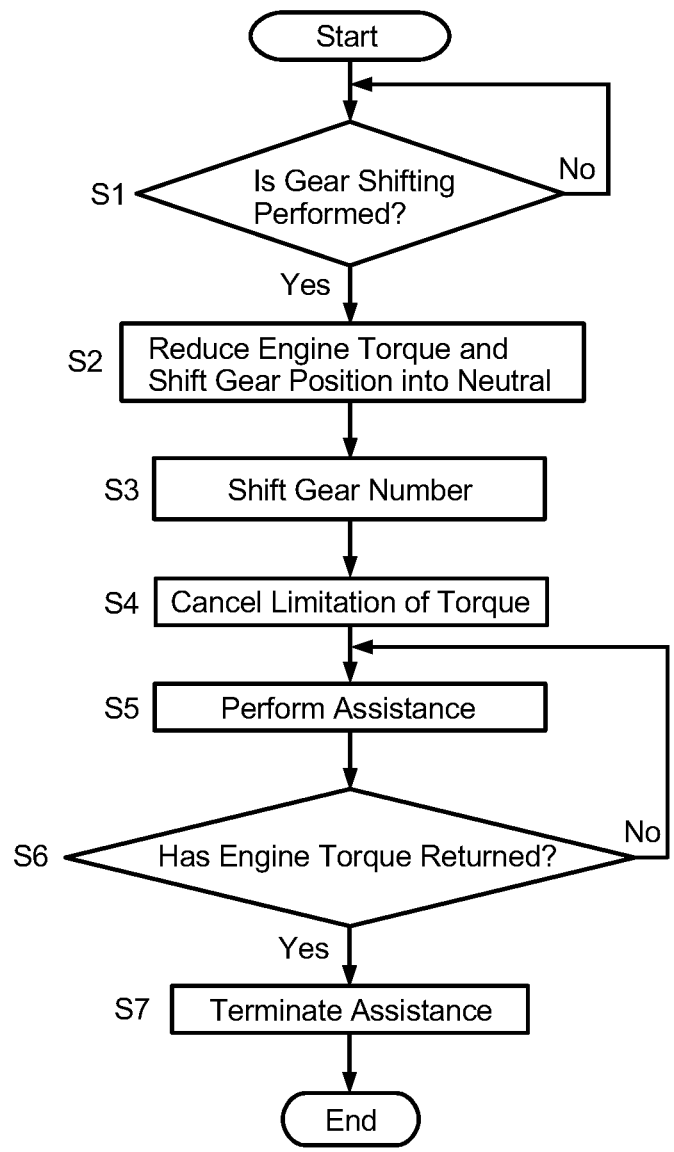
{FIG. 3} It shows a flowchart for illustrating a process in an output limitation control unit and a transmission control unit illustrated in FIG. 2.

At the "Start" of FIG. 3, the key switch 20 is in the ON state and the hybrid ECU 18 executes a computer program and the output limitation control unit 30 and the transmission control unit 31 are implemented by the hybrid ECU 18. The process goes to step S1. Note that the hybrid vehicle 1 runs in an output limitation mode at the "Start".

In step S1, the transmission control unit 31 determines whether a condition for shifting gears is satisfied. For example, at an acceleration mode in which the vehicle speed of the hybrid vehicle 1 gradually increases or at a deceleration mode in which the vehicle speed of the hybrid vehicle 1 gradually decreases, the gear shifting is performed according to the increase or the decrease in the vehicle speed. When it is determined in step S1 that the condition for shifting gears is satisfied, the process goes to step S2. On the other hand, when it is determined in step S1 that the condition for shifting gears is not satisfied, step S1 of the process is repeated.

The transmission control unit 31 reduces the torque of the engine 10 in order to shift the gear position into neutral in step S2, and shifts the gear position to a gear number according to the vehicle speed in step S3. At that time, the transmission control unit 31 temporarily disengages the clutch 12 and then reduces the torque of the engine 10. After that, the transmission control unit 31 shifts the gear position into neutral in order to shift the gear number and then controls the clutch 12 to be engaged again.

In step S4, the transmission control unit 31 cancels the limitation of the torque and the process goes to step S5.

In step S5, the transmission control unit 31 causes the electric motor 13 to assist the engine 10 and the process goes to step S6.

In step S6, the transmission control unit 31 determines whether the torque of the engine 10 returns to the state before the gear shifting has been performed. When it is determined in step S6 that the torque of the engine 10 returns to the state before the gear shifting has been performed, the process goes to step S7. On the other hand, when it is determined in step S6 that the torque of the engine 10 does not return to the state before the gear shifting has been performed, the process goes back to step S5.

In step S7, the transmission control unit 31 causes the electric motor 13 to terminate assisting the engine 10 and terminates a cycle of the process.

Next, the relationship between the limited acceleration and the gear numbers and the variation in the torque of the engine 10 when the gear shifting is performed at the output limitation control in the output limitation control unit 30 will be described with reference to FIG. 4. At the upper part of FIG. 4, the limited accelerations when the gear number is set at a second speed, a third speed, and a fourth speed are illustrated with dashed lines and the acceleration of the hybrid vehicle 1 is illustrated with a solid line. At the lower part of FIG. 4, the variation in the torque of the engine 10 of the hybrid vehicle 1 is illustrated while corresponding to the drawing of the upper part.

Figure 4:
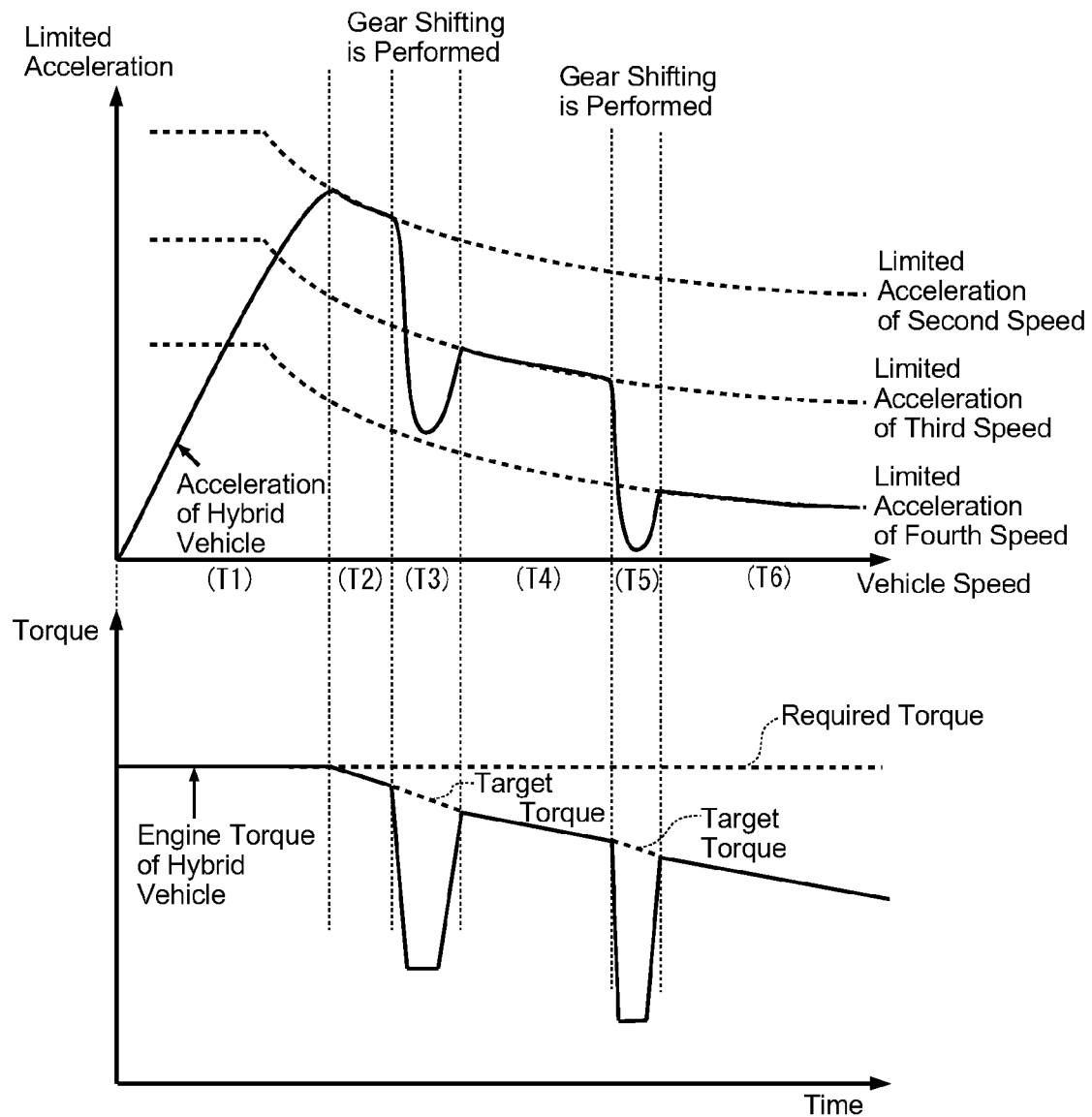
{FIG. 4} It shows a view for illustrating the relationship between the limited acceleration and the gear numbers and the variation in the torque in the gear shifting at the output limitation control in the output limitation control unit illustrated in FIG. 2.

As illustrated at the upper part of FIG. 4, the hybrid vehicle 1 accelerates at the second speed that is the starting gear number (a period T1). After the acceleration has reached the limited acceleration of the second speed, the acceleration is regulated along the limited acceleration only while the acceleration reaches the limited acceleration of the second speed (a period T2). When the gear shifting is performed at that time (a period T3), the gear number is shifted into neutral and the torque of the engine 10 is temporarily reduced. After the gear shifting has been completed, the torque of the engine 10 returns and the vehicle accelerates to the limited acceleration of the third speed.

After the hybrid vehicle 1 has continued running at the limited acceleration of the third speed and the vehicle speed further has increased (a period T4), the gear shifting is performed again (a period T5). When the gear shifting is performed at that time (the period T5), the gear number is shifted into neutral and the torque of the engine 10 is temporarily reduced. After the gear shifting has been completed, the torque of the engine 10 returns and the vehicle accelerates to the limited acceleration of the fourth speed. After that, the hybrid vehicle 1 runs at the limited acceleration of the fourth speed (a period T6).

Figure 5:
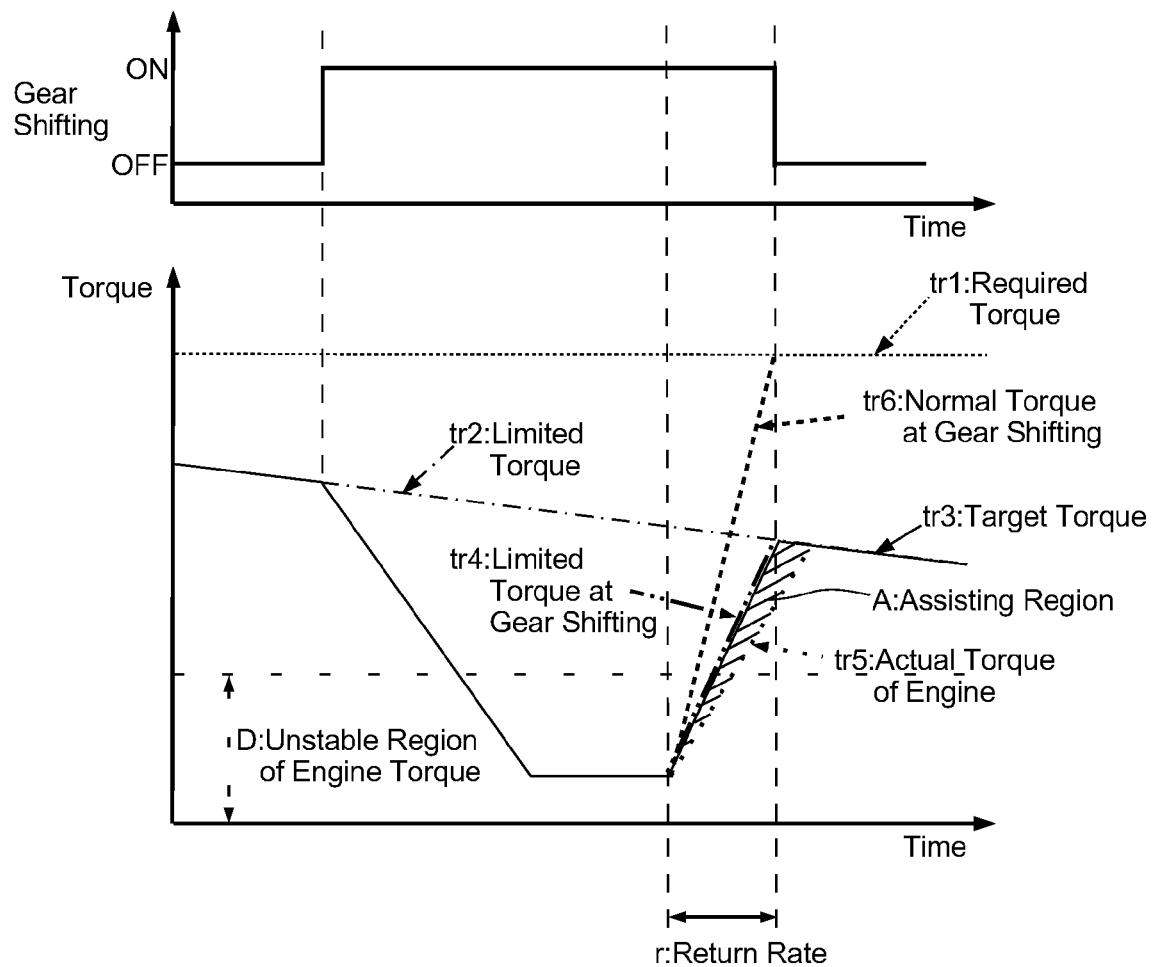
{FIG. 5} It shows a view for describing the variation in the torque by the transmission control in the transmission control unit illustrated in FIG. 2.

FIG. 5 enlarges the torque of the engine 10 in detail when the gear shifting is performed in FIG. 4 (the period T3 or the period T5). FIG. 5 illustrates a request torque tr1 by the driver, a limited torque tr2 by the output limitation control, a target torque tr3, a limited torque at gear shifting tr4, and an actual torque tr5 of the engine 10, and a normal torque at gear shifting tr6 as a comparison example. FIG. 5 further illustrates an assisting region A (shaded region) in which the electric motor 13 assists the engine 10, an unstable region D of the engine torque, and a return rate r.

Note that a knocking possibly occurs at the unstable region D of the engine torque depending on the characteristics of the engine 10. Thus, the engine torque preferably comes out of the unstable region D as soon as possible.

When the output limitation is not performed, the torque of the engine 10 starts to return to the required torque tr1 as illustrated with the normal torque at gear shifting tr6 because the required torque tr1 is equal to the target torque. On the other hand, when the output limitation is performed, the torque of the engine 10 starts to return to the target torque tr3 that has been set according to the limited acceleration. When the accelerator is depressed for a rapid acceleration, the target torque tr3 becomes smaller than the required torque tr1 according to the acceleration control as illustrated in FIG. 5.

As described above, when the target torque tr3 becomes smaller than the required torque tr1, the difference between the actual torque and the target torque becomes smaller in comparison with the case in which the output limitation is not performed. Thus, a P (proportion) I (integration) control according to the difference is performed, so that the rate until the return is completed becomes small. As a result, the feeling of acceleration decreases and the drivability is aggravated. Accordingly, it takes more time until the torque returns to the target torque in comparison with the case in which the output limitation is not performed. Thus, the time when the actual torque is in the unstable region D of the engine torque becomes long, so that the engine becomes unstable. As described above, the rise of the torque of the engine 10 becomes slower in comparison with the case without limitation so that the actual torque tr5 of the engine cannot reach the target torque tr3 within the return rate r.

In light of the foregoing, for example, the transmission control unit 31 causes the electric motor 13 to assist the engine 10 in order to enable the torque to return to the target torque in the same time as in the case in which the output limitation is not performed.

Here, on the assumption that a T is the actual torque of the engine 10, a TI is the proportion torque, a TP is the integration torque, a Tref is the target torque, a ΔT is the difference between the target torque and the actual torque, and an I is the gain in the proportion control, $$T = TI + TP \quad (1)$$

$$TI = \Delta T \cdot I \quad (2)$$

$$\Delta T = Tref - T \quad (3)$$

can be expressed. The actual torque T is PI-controlled as shown in the expression (1). The TI is obtained by multiplying the difference ΔT between the actual torque T and the target torque (the expression 3) by the I gain as shown in the (expression 2). Then, the I gain is set as a large value at the timing when the actual torque T returns to the target torque Tref. As a result, to obtain a desired T, the torque of the electric motor 13 is added to the torque of the engine 10 and the electric motor 13 assists the engine 10. Further, when the gear number is shifted into neutral at that time, the gain I is changed. After that, when the fact that the gear shifting has been completed is notified from the transmission 16, the gain I returns to the original. As an example of the variations in the gain I, the gain I when the torque returns from neutral is ten times as much as the gain I when the gear shifting is completed.

This enables the torque to reach the target torque tr3 in the period of the return rate r as described with the limited torque at gear shifting tr4 even when the output limitation is performed. At that time, the region in which the electric motor 13 assists the engine 10 corresponds to the assisting region A. Note that increasing the torque of the engine 10 also enables the actual torque tr5 of the engine to reach the target torque tr3 in the period of the return rate r. As described above, applying the control only by the engine 10 enables the present control to be applied to a vehicle other than a hybrid vehicle. Such a control only by the engine 10 is preferably not applied in the present embodiment because the control is performed for the hybrid vehicle 1 and the control only by the engine 10 causes poor fuel efficiency.

(Effect)

In the hybrid vehicle 1, when the gear shifting is performed while the output limitation control unit 30 performs the output limitation, the output limitation is temporarily cancelled during the process for returning the torque that has been reduced in neutral. Further, the assistance is controlled in order to add the torque by the electric motor 13 to the torque of the engine 10. Thus, the drivability when the gear shifting is performed can be improved.

(Other Embodiments)

The above-mentioned return rate r can variably be set according to the gross weight of the hybrid vehicle 1 or the degree of the upgrade surface on which the hybrid vehicle 1 runs. For example, when the clutch 12 is temporarily disengaged and the gear position is shifted into neutral for gear shifting while the gross weight of the hybrid vehicle 1 is large, or while the upgrade surface on which the hybrid vehicle 1 runs is steep, the amount of the deceleration is larger in comparison with the case when the gross weight of the hybrid vehicle 1 is small, or when the surface on which the hybrid vehicle 1 runs is flat. In light of the foregoing, the return rate r is shortened when the gross weight of the hybrid vehicle 1 is large, or when the upgrade surface on which the hybrid vehicle 1 runs is steep in comparison with the case when the gross weight of the hybrid vehicle 1 is small, or when the surface on which the hybrid vehicle 1 runs is flat. This causes the rise of the torque to be rapid after the clutch 12 has been engaged again after the gear number has been changed, so that the feeling of decreasing speed with the gear shifting can be reduced.

To change the return rate r, it is preferable that a threshold is provided to the gross weight of the hybrid vehicle 1 or to the upgrade surface on which the hybrid vehicle 1 runs and the return rate r is shortened when the gross weight or the upgrade surface exceeds the threshold. Note that it is preferable to monitor both of the gross weight of the hybrid vehicle 1 and the upgrade surface on which the hybrid vehicle 1 runs and change the return rate r when one of the gross weight and the upgrade exceeds the threshold. Alternatively, both of the gross weight of the hybrid vehicle 1 and the upgrade surface on which the hybrid vehicle 1 runs are monitored, and the return rate r can be changed in two stages when one of the gross weight and the upgrade surface exceeds the threshold and when both of the gross weight and the upgrade surface exceed the thresholds. It is preferable in that case that the return rate r when both of the gross weight of the hybrid vehicle 1 and the upgrade surface on which the hybrid vehicle 1 runs exceed the thresholds is further shorter than the return rate r when one of the gross weight and the upgrade exceeds the threshold.

Further, although the engine 10 has been described as an internal combustion engine, the engine 10 can also be a heat engine including an external combustion engine.

While the computer program executed by the hybrid ECU 18 is installed on the hybrid ECU 18 in advance in the description above, the computer program can be installed on the hybrid ECU 18 as a computer by attaching removable media recording the computer program (storing the computer program), for example, to a drive (not shown in the drawings) and storing the computer program read from the removable media in a non-volatile memory inside the hybrid ECU 18, or receiving, by a communication unit (not shown in the drawings), a computer program transmitted through a wired or wireless transmission medium and storing the computer program in a non-volatile memory inside the hybrid ECU 18.

Further, each ECU can be implemented by an ECU combining each of the ECUs. Alternatively, an ECU can newly be provided by the subdivision of the function of each ECU.

Note that the computer program executed by the computer can be for performing the process in chronological order according to the order described herein or can be for performing the process in parallel or at the necessary timing, for example, when the computer program is invoked.

Further, the embodiments of the present invention are not limited to the above-mentioned embodiments, and can be variously modified without departing from the gist of the invention.

The invention claimed is:

1. A transmission control device provided in a hybrid vehicle that includes an engine and an electric motor, that is capable to select running by the engine or the electric motor or to select running by cooperation between the engine and the electric motor, the transmission control device comprising:
   an ECU configured to perform functions of a transmission control unit and an output limitation control unit:
      the transmission control unit configured to automatically shift a gear number according to a variation in a vehicle speed, and
      the output limitation control unit configured to limit torque output from the engine and/or the electric motor at each of the gear numbers;
   wherein the the transmission control unit performs a control for temporarily reducing the torque output from the engine in neutral while a gear is transferred from a gear number before the shift to a gear number after the shift through neutral once, and when the output limitation control unit limits the torque, the transmission control unit performs a control for temporarily canceling the output limitation in a process for returning the torque that has temporarily been reduced in neutral, and adding torque by the electric motor to torque of the engine.

2. A transmission control method of a hybrid vehicle that includes the an engine and an electric motor, that is capable to select running by the engine or the electric motor or capable of to select running by cooperation between the engine and the electric motor, wherein the transmission control method is executed by an ECU configured to perform functions of a transmission control unit and an output limitation control unit, the control method comprising:
   shifting, by the transmission control unit, a gear number automatically according to a variation in a vehicle speed, and
   limiting, by an output limitation control unit, torque output from the engine and/or the electric motor at each of the gear numbers;
   wherein, in the transmission control unit, the ECU performs a control for temporarily reducing the torque output from the engine in neutral while a gear is transferred from a gear number before the shift to a gear number after the shift through neutral once, and when the torque is limited in the output limitation control unit, the transmission control unit performs a control for temporarily canceling the output limitation in a process for returning the torque that has temporarily been reduced in neutral, and adding torque by the electric motor to torque of the engine.

3. A hybrid vehicle comprising an engine and an electric motor, that is capable to select running by the engine or the electric motor or running by cooperation between the engine and the electric motor, the hybrid vehicle comprising:
   an ECU for transmission control configured to perform functions of a transmission control unit and an output limitation unit:
      the transmission control unit configured to shift a gear number automatically according to a variation in a vehicle speed, and
      the output limitation unit configured to limit torque output from the engine and/or the electric motor at each of the gear numbers;
   wherein the transmission control unit performs a control for temporarily reducing the torque output from the engine in neutral while a gear is transferred from a gear number before the shift to a gear number after the shift through neutral once, and when the output limitation unit is limiting the torque, the transmission control unit performs a control for temporarily canceling the output limitation in a process for returning the torque that has temporarily been reduced in neutral, and adding torque by the electric motor to torque of the engine.

* * * * *